United States Patent [19]

Nowers et al.

[11] Patent Number: 4,569,359

[45] Date of Patent: Feb. 11, 1986

[54] METHOD AND APPARATUS FOR VENTILATED CIGARETTE MANUFACTURE

[75] Inventors: John R. Nowers, London; Robert E. Williams, High Wycombe, both of England

[73] Assignee: Molins PLC, London, England

[21] Appl. No.: 588,982

[22] Filed: Mar. 13, 1984

[30] Foreign Application Priority Data

Mar. 18, 1983 [GB] United Kingdom ............... 8307539

[51] Int. Cl.⁴ .............................................. A24C 5/56
[52] U.S. Cl. .................................... 131/281; 131/905; 73/37.7
[58] Field of Search ................ 131/281, 36, 280, 60, 131/904, 905; 73/38, 37.7; 250/562, 572

[56] References Cited

U.S. PATENT DOCUMENTS

| | | |
|---|---|---|
| 4,193,409 | 3/1980 | Wahle et al. ........................ 131/280 |
| 4,240,448 | 12/1980 | Heitmann et al. .................. 131/36 |
| 4,390,032 | 6/1983 | Labbe et al. ........................ 131/281 |

Primary Examiner—V. Millin
Assistant Examiner—H. Macey
Attorney, Agent, or Firm—Antonelli, Terry & Wands

[57] ABSTRACT

Apparatus for making ventilated cigarettes, includes a first perforator which is not readily susceptible to control and is arranged to perforate the tipping paper by which cigarettes are joined to filter portions, or to perforate the completed filter cigarettes. A controllable perforator is arranged to form additional perforations in the tipping paper prior to assembly of the filter cigarettes; and a control circuit is arranged to control the controllable perforator in response to a porosity measuring device and/or in response to a cigarette dilution testing device.

18 Claims, 3 Drawing Figures

METHOD AND APPARATUS FOR VENTILATED CIGARETTE MANUFACTURE

This invention is concerned with the manufacture of ventilated filter cigarettes, which are cigarettes having ventilation side holes near their mouth ends through which the smoker draws in air from the atmosphere which dilutes the cigarette smoke.

A problem associated with producing ventilated cigarettes is that of maintaining the mean dilution and the standard deviation within acceptable limits. One way of producing ventilated cigarettes involves perforating the tipping paper which joins the cigarette (tobacco portion) to the filter. Another way involves perforating the completed filter cigarettes. Examples of such systems using perforating pins are described respectively in British patent specifications Nos. 2055669 and 1564219. However, with both those systems it is difficult to control the ventilation adequately.

According to the present invention there is provided a method of forming ventilated cigarettes in which each completed cigarette or the tipping paper is perforated by means of a first perforator (preferably employing pins) which is not readily susceptible to control; and additional perforations are formed in the tipping paper by means of a controllable perforator which is controlled in response to a porosity measuring device (in the event that the first perforator perforates the tipping paper) and/or in response to a cigarette dilution testing device.

The controllable perforator is preferably a laser which may, for example, be pulsed at a frequency depending upon the number of additional perforations it is required to form in the tipping paper. Alternatively, a spark perforator may be used, but it would be particularly important in that case to form the additional perforations well away from the initial perforations since the sparks would otherwise tend to pass through the initial perforations and thus not form (or not do so reliably) additional perforations.

It should be understood that the expression "porosity measuring device" in this context refers to a device for measuring the porosity of the tipping paper resulting from the initial perforations. The cigarette dilution testing device, which may for example be as described in British patent specification No. 2050804, tests the dilution characteristic of the completed cigarettes.

If the first-mentioned perforator is arranged to perforate the tipping paper before assembly of the cigarettes, the control means for controlling the controllable perforator is preferably arranged to adjust the controllable perforator rapidly in response to changes in the porosity of the tipping paper (as indicated by a porosity measuring device) and to adjust the controllable perforator in response to changes in cigarette dilution in a progressive (gradual) manner.

Examples of systems according to this invention are shown in the accompanying drawings. In these drawings.

Figure 1:
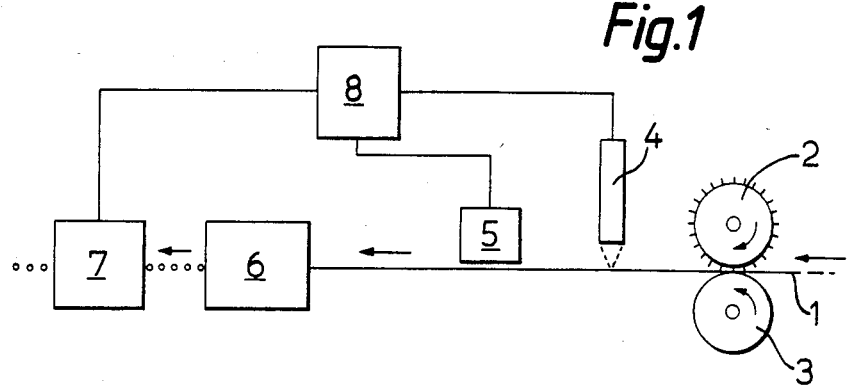
FIG. 1 is a schematic view showing the perforators, a filter assembly machine and a cigarette testing device.
Figure 2:
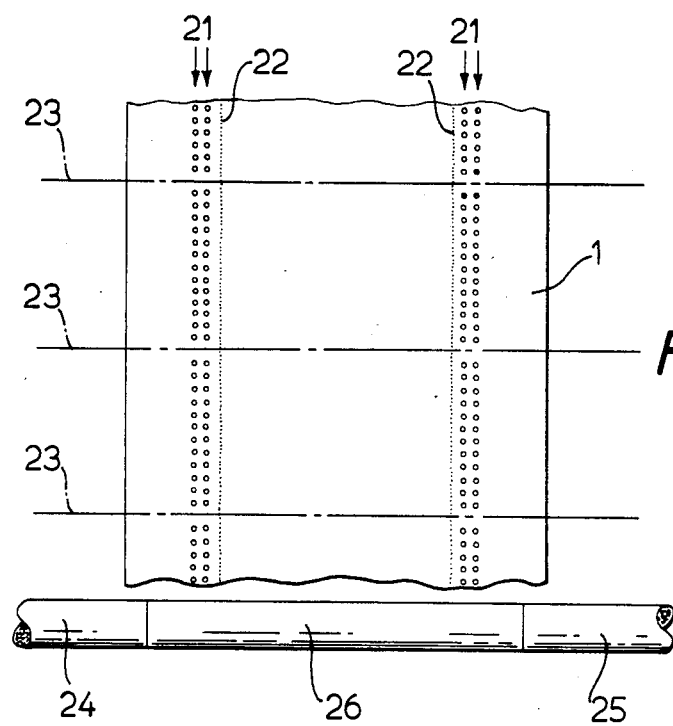
FIG. 2 is a plan view showing the perforation pattern applied to the tipping paper.

A system is shown in FIG. 1 in which cigarette tipping paper 1 is fed between rollers 2 and 3 to form initial rows of perforations. For that purpose, the roller 2 carries pins which form, in cooperation with the roller 3, two parallel tracks of perforations, each track comprising in this example two rows 21 (FIG. 2). The tipping paper then passes two lasers 4 which add rows 22 of fine perforations, and then passes a porosity measuring device 5 which measures the porosity of the tipping paper in the region of each of the perforated areas. The operation of the porosity measuring device 5 is, for example, pneumatic (measuring the pressure drop through the tipping paper) or optical.

A filter assembler 6 cuts the tipping paper along transverse lines 23 to form separate portions each of which is then wrapped around an assembly comprising two cigarettes 24 and 25 with an interposed double filter portion 26. A disc knife in the filter assembler 6 then cuts the double filter cigarette assemblies through the middle to form individual filter cigarettes which are conveyed through a cigarette testing device 7.

Operation of the lasers 4 to determine the total additional area of the perforations added in each row 22 is controlled by a control circuit 8. This may be arranged to provide a quick response to changes in the porosity measured by the porosity measurement device 5, subject to long-term control in response to the cigarette testing device 7.

The control circuit may be generally as described in our British patent specification No. 2121669. That is to say, it is arranged to control the perforator in response to a comparison between the porosity measurement and a reference signal; the cigarette testing device is arranged to emit a correction signal whenever the dilution departs from a predetermined level, the correction signal being arranged to alter the reference level of the porosity measuring device, preferably in a progressive manner. In this context, the expression "progressive manner" is intended to denote an arrangement in which the reference level is changed relatively slowly; in contrast, the porosity measuring device is preferably arranged to change the operation of the perforator relatively quickly when it detects a change in the porosity of the web, for example resulting from change in the web velocity while the machine is being started up or shut down.

In a preferred arrangement, the cigarette testing device is arranged to control the reference signal via an up-down counter. Thus, a change of the cigarette dilution in any particular direction produces a small stepped change in the reference signal, such changes occurring in response to a count which preferably corresponds to the passage of cigarettes through the machine; that is to say, is related to the speed of operation of the machine.

Figure 3:
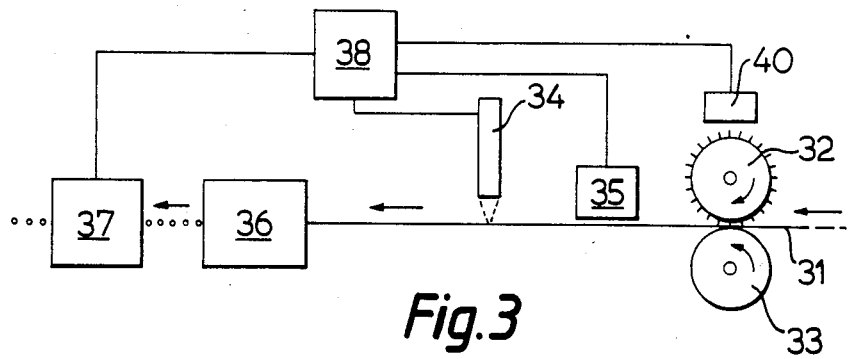
FIG. 3 is a schematic view of an alternative arrangement of the perforators and testing devices.

An alternative system is shown in FIG. 3 in which components which are similar to components in FIG. 1 have the same reference numeral with 30 added. In this arrangement the porosity of the tipping paper 31 is measured before the paper is perforated by the laser 34. In this way the porosity of the paper is "topped up" to a reference value after its porosity has been measured. The operation of the laser is also controlled in response to the speed of the web which is measured by means of a tachometer 40.

Each of the lasers 4 may comprise a pulsed laser, for example one made by Ferranti PLC and known as type CM 1034. Control of the laser may be in relation to the frequency of pulsing, the energy released in each pulse, or by combination of these factors. The pulsing may be controlled cyclically so that, instead of being continuous, each row 22 may consist of successive spaced sections corresponding to successive portions of the tipping paper, the length of each spaced section being possibly controllable.

It should be noted that the rollers 2, 3 and 32, 33 are driven at equal speeds and are timed so that the cut lines at positions 23 pass between successive pin perforations as described in our British patent specification No. 2055669. On the other hand, the rows of finer perforations 22 may be continuous.

The use of two separate lasers 4 or 34 allows separate control of the additional perforations produced by the two lasers to compensate for any differences in the operation of the two sets of pins. However, as an alternative, a single laser may be used with a beam splitting device to produce the two rows of fine perforations. Another possibility is that there may be two separate lasers, as described above, each of which has its output beam split to produce two or more rows of fine perforations.

In principle the laser perforations in each track may be on either side of the row or rows of pin perforations, or may lie between two rows of pin perforations. However, it is preferable for the laser perforations to be separated from the pin perforations by at least 1 mm in order for the laser perforations to have substantially their maximum effect on the dilution of the completed cigarettes.

We claim:

1. A method of forming ventilated cigarettes in which the tipping paper of each cigarette is mainly perforated by means of a first perforator which is not readily susceptible to accurate control of the degree of perforation effected thereby for producing an approximate level of ventilation slightly below a desired level; and additional perforations are formed in the tipping paper by means of an accurately controllable perforator which is controlled in response to a measuring signal from a testing device indicating the affect of the first-mentioned perforations on the ventilation provided by said tipping paper.

2. A method according to claim 1 in which said testing device is a porosity measuring device and in which the porosity of the web is measured after the formation of the first perforations but before the formation of the additional perforations.

3. A method according to claim 2 in which the accurately controllable perforator is also controlled in response to the speed of the tipping paper.

4. A method according to claim 1, wherein said testing device is a cigarette dilution testing device.

5. Apparatus for making ventilated cigarettes, including first perforator means which is not readily susceptible to accurate control of the degree of perforation effected thereby for forming perforations at least in the tipping paper by which cigarettes are joined to filter portions so as to produce an approximate level of dilution slightly below a desired level; a second accurately controllable perforator means for forming additional perforations in the tipping paper prior to assembly of the filter cigarettes; and control means arranged to control said second perforator means in response to a measuring signal from a testing device which indicates the affect of the first-mentioned perforations on the ventilation provided by said tipping paper.

6. Apparatus according to claim 5 in which the first perforator means is a mechanical perforator.

7. Apparatus according to claim 6 in which the first perforator means comprises pins.

8. Apparatus according to any one of claims 5 to 7 in which the second perforator means is a laser perforator.

9. Apparatus according to claim 8 in which the laser perforator is arranged to emit pulses of laser radiation.

10. Apparatus according to claim 9 in which the frequency of the pulses is controlled in response to the measuring signal from a porosity measuring device which measures the porosity of said tipping paper.

11. An apparatus according to claim 9, in which the frequency of the pulses is controlled in response to the measuring signal from a cigarette dilution testing device.

12. Apparatus for producing ventilated cigarettes, comprising means for transporting a web of cigarette tipping paper to a cigarette assembly machine; first perforator means which is not readily susceptible to accurate control of the degree of perforation effected thereby for forming perforations at least in a first region of the web to produce an approximate level of ventilation slightly below a desired level; a second controllable perforator means for perforating a second region of the web to complete the ventilation effect; means for measuring the porosity of the web after it has been perforated at least by the first perforator means; for measuring the dilution of cigarettes assembled by the assembly machine which include sections of the perforated web; and control means for controlling the second perforator means in response to the measured porosity and in response to the measured dilution.

13. Apparatus according to claim 9 in which the control means is arranged to adjust the second perforator means rapidly in response to changes in the web porosity and is arranged to adjust the second means in response to changes in cigarette dilution in a progressive manner.

14. A method of forming ventilated cigarettes, comprising the steps of mainly perforating a component of the wrapper of each cigarette by means of a first perforator which is not readily susceptible to accurate control of the degree of perforation effected thereby for producing an approximate level of ventilation slightly below a desired level; testing the effect of at least the perforations by said first perforator on the ventilation of at least said component of the wrapper; and forming additional perforations in a component of the wrapper of each cigarette using a second perforator which is susceptible to accurate control of the degree of perforation effected thereby in response to the results of said testing step to complete the ventilation effect.

15. A method according to claim 14, wherein said first perforator is caused to perforate the tipping paper of each cigarette before the cigarette is assembled.

16. A method according to claim 15, wherein said testing step comprises testing the porosity of the tipping paper after it has been perforated by said first perforator.

17. A method according to claim 14, wherein said first perforator is caused to perforate each cigarette after it has been assembled.

18. A method according to claims 15 or 17, wherein said testing step comprises testing the dilution of the cigarette after it is assembled.

* * * * *